Aug. 4, 1970  D. GOLDMAN  3,522,520
ALTERNATOR WITH ROTARY TRANSFORMER FOR SELF-EXCITATION
Filed Nov. 20, 1967
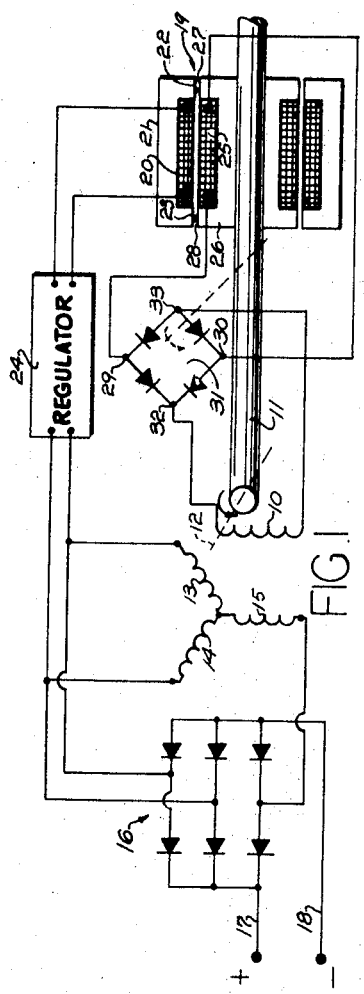
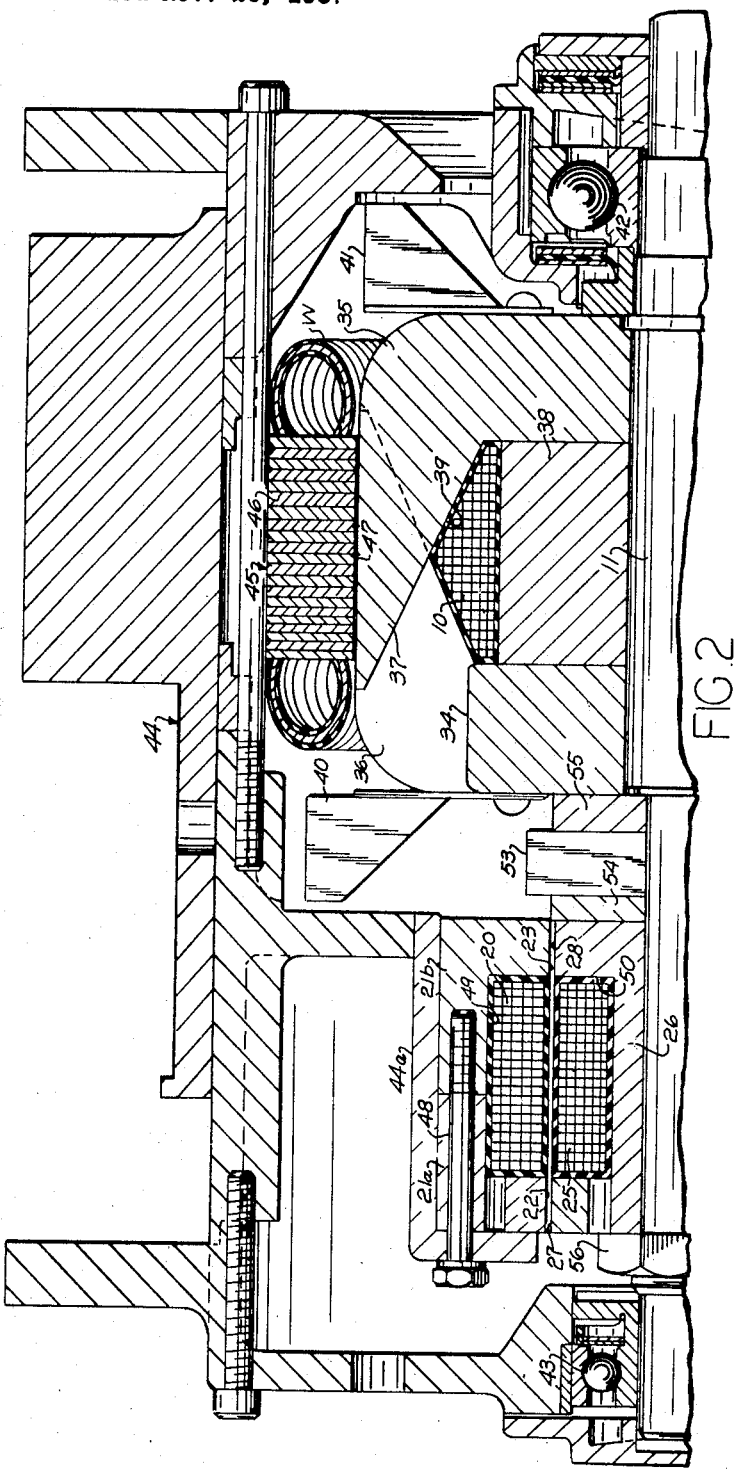
INVENTOR.
DAVID GOLDMAN
BY
Young, Flynn & Tarolli
ATTORNEYS

United States Patent Office 3,522,520
Patented Aug. 4, 1970

3,522,520
ALTERNATOR WITH ROTARY TRANSFORMER FOR SELF-EXCITATION
David Goldman, Cleveland, Ohio, assignor to Victoreen Leece Neville, Inc., a corporation of Ohio
Filed Nov. 20, 1967, Ser. No. 684,129
Int. Cl. H02p 9/38
U.S. Cl. 322—28           2 Claims

ABSTRACT OF THE DISCLOSURE

In the present system an alternator has a field winding mounted on a rotary shaft which is driven from the engine of an automotive vehicle. The alternator field winding is excited by a rotary transformer having a stationary primary and a rotatable secondary mounted on the same shaft as the alternator field winding. The primary and secondary of the rotary transformer each have a pair of annular pole tips and respective windings, with the secondary pole tips being in confronting relationship, respectively, to the primary pole tips so that the secondary is energized from the primary independent of the rotation of the secondary with respect to the primary. The transformer primary is connected to be energized from the alternator output through a regulator. A rectifier bridge, which is mounted on the same shaft as the alternator field winding and the transformer secondary, connects the transformer secondary to the field winding to provide DC energization of the field winding from the transformer secondary.

---

This invention relates to a self-excited alternator system.

Alternators have come into widespread use on automotive vehicles for maintaining the vehicle battery charged to its full operating voltage. In such automotive applications, the field winding of the alternator is mounted on a rotary shaft which is driven from the vehicle engine, and the magnitude of the alternator output is dependent upon the rotational speed of the field winding, as well as upon the magnitude of the excitation power applied to the field winding. The need for excitation power to the field winding is greatest, therefore, when the engine of the automotive vehicle is operating at its relatively low idling speed, so as to enable the alternator to provide the maximum possible output under these conditions.

The present invention is directed to a novel arrangement for providing self-excitation of the alternator through a rotary transformer which is constructed and arranged to provide the maximum available energization of the alternator field winding from the alternator output at the engine idling speed.

Accordingly, it is a principal object of this invention to provide a novel and improved self-excited alternator system having a rotary transformer exciter of simplified construction which provides efficient feedback of excitation power from the alternator output to its field winding, independent of the rotational speed of the transformer secondary with respect to the transformer primary.

Another object of this invention is to provide a novel and improved self-excited alternator system for use on an automotive vehicle and having a rotary transformer with a relatively simple winding arrangement and constructed to provide efficient excitation of the alternator field winding from the alternator output at low vehicle engine speeds.

Another object of this invention is to provide a novel and improved self-excited automotive alternator system having a rotary transformer which is adapted to be added to any conventional brush-type automotive alternator, regardless of the number of its poles, to convert it to brushless self-excitation.

Another object of this invention is to provide a novel and improved self-excited alternator system having a rotary transformer exciter of simplified construction compared to the so-called rotary transformers of the induction motor type which have primary windings in circumferentially-spaced slots on the stator and secondary windings in circumferentially-spaced slots on the rotor.

Another object of this invention is to provide a novel and improved self-excited alternator system having a rotary transformer exciter which provides feedback excitation of the alternator which is independent of the rotational speed of the transformer secondary with respect to the transformer primary, regardless of whether the transformer primary is energized with single-phase power or plural-phase power.

Further objects and advantages of this invention will be apparent from the following detailed description of a presently-preferred embodiment thereof, which is illustrated schematically in the accompanying drawing.

In the drawing:

FIG. 1 illustrates schematically the self-excited alternator system of the present invention; and FIG. 2 is a longitudinal half-section showing the preferred construction of the alternator and the rotary transformer in accordance with the present invention.

Referring to FIG. 1, the alternator in the present system has a conventional field winding 10 mounted on a rotary shaft 11 which is driven from the engine of the automotive vehicle. This mounting is indicated schematically by the dashed-line 12 in FIG. 1 and the accompanying arrow to indicate that the field winding 10 rotates in unison with the shaft 11. In the embodiment illustrated, the alternator has a stator with Y-connected output windings 13, 14 and 15, whose outer ends are connected respectively to the components of a rectifier assembly 16, which is connected across positive and negative DC output conductors 17 and 18. While a stator having Y-connected output windings is shown, it is to be understood that these windings may be Delta-connected, if desired.

In the operation of the alternator, the field winding 10 is energized with direct current and is rotated by the shaft 11 to induce alternating current in the output windings 13, 14 and 15 of the stator, and the AC output of the alternator is rectified by the rectifier assembly 16 to produce a direct current output across the load conductors 17 and 18.

In accordance with the present invention, the DC self-excitation of the alternator is provided from a rotary transformer 19 of relatively simple construction. The rotary transformer 19 has a stationary primary winding 20 carried by an annular body 21 of readily magnetizable material. The primary winding 20 and the body 21 extend generally cylindrically about the shaft 11. As indicated schematically in FIG. 1, the body 21 is generally U-shaped in longitudinal section, presenting a pair of axially-spaced, radially inwardly-facing, annular pole tips 22 and 23 at the opposite axial ends of the primary winding 20. The primary winding 20 is connected across the outer ends of two of the stator output windings 13 and 14 of the alternator through a regulator 24, which may be either a voltage regulator or a current regulator, or both. The regulator 24 may be of any conventional design which will operate to pass current from the alternator output to the transformer primary winding 20 as long as the alternator output is below a predetermined level of voltage or current, depending upon whether the regulator is a voltage regulator or a current regulator, or both a voltage and current regulator.

The rotary transformer 19 has a secondary winding 25 mounted in an annular body 26 of readily magnetizable material which is attached to the shaft 11 for rotation in unison with the shaft and in unison with the alternator field winding 10. The secondary winding 25 and the body 26 extend generally cylindrically about the shaft 11, concentric with the winding 20 and body 21 of the transformer primary. This body 26 is generally U-shaped in longitudinal section, as illustrated schematically in FIG. 1, and it presents a pair of axially-spaced, radially outwardly-facing, annular pole tips 27 and 28 at opposite axial ends of the secondary winding 25 which are in closely spaced, confronting relationship respectively to the pole tips 22 and 23 on the body 21 of the transformer primary. The pole tips 22 and 27 define an annular, radial air gap between the transformer primary and secondary, and the pole tips 23 and 28 provide a second annular, radial air gap between the transformer primary and secondary.

With this construction of the transformer, the excitation of the primary winding 20 will induce a voltage across the secondary winding 25 which, for a given voltage applied to the primary winding 20, will remain the same regardless of whether the secondary winding 25 is rotating with respect to the stationary primary or not. That is, the magnitude of the voltage induced across the transformer secondary winding 25 will be dependent solely upon the voltage applied to the transformer primary winding 20 and will not be dependent upon the speed at which the secondary winding 25 may be rotating with respect to the primary winding 20.

The opposite ends of the transformer secondary winding 25 are connected to the opposite input terminals 29 and 30 of a rectifier bridge 31. This rectifier bridge is composed of four semiconductor rectifiers mounted on the shaft 11 for rotation in unison with the shaft. The rectifier bridge 31 has a pair of output terminals 32 and 33 which are connected respectively to the opposite ends of the alternator field winding 10 to apply DC energization current of proper polarity to the latter in response to the AC voltage induced across the transformer secondary winding 25.

FIG. 2 illustrates a preferred structural embodiment of the present invention in which the alternator itself is a Lundell-type alternator, characterized by relatively low field winding excitation reuqirements. The field winding 10 of this alternator is carried by a rotor having a pair of complemental rotor members 34 and 35, each presenting an annular series of circumferentially-spaced, axially-extending, integral fingers 36 and 37, respectively, with each finger 36 on the rotor member 34 extending into the circumferential space between each pair of successive fingers 37 on the other rotor member 35 and separated from the fingers 37 by air gaps. The radially inward ends of the rotor members 34 and 35 are joined by an annular piece 38 which is disposed axially between them in metal-to-metal engagement with each. The rotor members 34, 35 and the connecting piece 38 are all composed of readily magnetizable material. The field winding 10 of the alternator is snugly disposed in an annular pocket 39 formed on the rotor between the outside of the connecting piece 38 and the radially inward sides of the respective rotor fingers 36 and 37. The entire assembly of the rotor, including the field winding 10, is rigidly mounted on the shaft 11 for rotation in unison with the shaft. The rotor members 34 and 35 carry respective heat-dissipating vanes or blades 40 and 41, which are bolted to the respective opposite axial ends of these rotor members.

The shaft 11 is rotatably supported by anti-friction bearings 42 and 43 carried by a stationary housing 44. This housing fixedly supports the output windings W of the alternator, which were identified for the three different phases as 13, 14, 15 in FIG. 1. These output windings W are part of the stator 45 of the alternator, which also includes a series of laminations 46 of readily magnetizable material, which are spaced radially outward from the rotor fingers 36 and 37 by a small air gap 47. The output windings are seated in slots in the magnetic laminations 46, and each output winding is insulated electrically from the other output windings and from the magnetic laminations 46 of the stator.

In the operation of the alternator, when a DC voltage is applied to the field winding 10, this causes the rotor members 34 and 35 to be magnetized such that, for example, every one of the fingers 36 on the rotor member 34 will be magnetically polarized North and every one of the fingers 37 on the other rotor member 35 will be magnetically polarized South. Therefore, the rotor will present a series of circumferentially spaced magnetic poles which are North and South in alternate sequence. When the shaft 11 rotates, the magnetic fields between these poles revolve in unison with it to induce alternating current of the desired phase sequence in the stationary output windings W on the stator 45 of the alternator.

Residual magnetism in the rotor 34, 35, 38 of the alternator will provide the initial excitation for the transformer primary when the shaft 11 attains a predetermined rotational speed.

The stationary housing 44 for the alternator carries a bracket 44a which fixedly supports the body 21 of the transformer primary. As shown in FIG. 2, this body 21 is made up of a pair of body members 21a and 21b which are clamped against each other end-to-end and to the support bracket 44a by one or more bolts 48. Both body members 21a and 21b are generally cup-shaped, and together they define between them an annular recess or chamber 49 in which the primary winding 20 is seated snugly. The body member 21a has an annular end wall at one axial end of the primary winding 20 which projects radially inwardly and terminates in the radially inwardly-facing, annular pole face 22. Similarly, the other body member 21b has a radially inwardly-projecting, annular end wall at the opposite axial end of the primary winding 20 which terminates in the radially-inwardly-facing, annular pole tip 23.

The body 26 of the transformer secondary is a one-piece structure having an annular peripheral recess 50 in which the secondary winding 25 is seated snugly. At the opposite axial ends of this recess 50, the body 26 presents radially outwardly-projecting, annular end walls which terminate respectively in the radially outwardly-facing, annular pole tips 27 and 28. These pole tips are spaced radially from the respective confronting pole tips 22 and 23 on the body of the transformer primary by small radial, cylindrical air gaps.

With this transformer construction, the AC voltage applied to the primary winding 20 of the transformer will induce magnetic flux in its body members 21a and 21b which flows across the radial air gaps between the confronting pairs of pole tips 22, 27 and 23, 28 to induce a corresponding output voltage across the secondary winding 25. The magnitude of this output voltage across the secondary windings is unaffected by rotation of the secondary winding 25 with respect to the primary winding 20 and, therefore, it will depend solely upon the magnitude of the input voltage to the primary winding 20 and, for a given input voltage, it will be the same for any rotational speed of the secondary winding 25. Therefore, it will provide the maximum available feedback excitation to the alternator field winding 10 when the vehicle engine is idling, which is when such excitation is most needed in order to provide a high power output from the alternator.

The rectifier bridge 31 is contained in a support, indicated schematically at 53 in FIG. 2. This support is engaged axially between a pair of thrust plates 54 and 55 having their opposite ends abutting respectively against the body 26 of the transformer secondary and the rotor member 34 of the alternator. A nut 56 is threadedly mounted on the shaft 11 to provide an axial abutment for the axially outward end of the body 26 of the transformer secondary.

With the present arrangement, the rotary transformer constitutes a simple and rugged arrangement for the self-excitation of the altenator, there being only a single coil in the transformer primary and a single coil in the transformer secondary. The rotary transformer in the present system avoids the complexity and expense of inserting windings in a series of circumferentially-spaced slots on its stator and rotor, as in so-called rotary transformers constructed like an induction motor. The transfer of feedback energy across the air gap between the transformer primary and its secondary is not dependent upon the rotational speed of the secondary with respect to the stationary primary, and it enables the maximum available excitation energy to be fed back from the alternator output to the alternator field winding when the vehicle engine is running at low speed. This enables the alternator to increase its output rapidly without having to depend entirely upon an increase in the engine speed to achieve this effect. The transfer of feedback energy between the primary and secondary will be independent of the relative rotational speed between them, regardless of whether the transformer primary has single-phase excitation or two or three-phase excitation because the present rotary transformer imposes no limitation on the system in this respect. The rotating transformer has an extremely high efficiency of operation, so that it requires a minimum of cooling and is comparatively small in size for the energy transfer which it provides between the alternator output and the alternator field winding. The rotary transformer provides adequate self-excitation of the altenator so that the alternator itself may be of the same construction as conventional Lundell-type alternators now used on automotive vehicles. Any brush-type automotive alternator, regardless of the number of its poles, can be converted to brushless self-excitation by the addition of the rotary transformer exciter in accordance with the present invention.

While a presently-preferred embodiment of the present system has been described in detail with reference to the accompanying drawing, it is to be understood that various modifications, omissions and refinements which depart from the disclosed embodiment may be adopted without departing from the spirit and scope of the present invention. For example, the primary of the rotary transformer exciter may be coupled to the alternator output other than through a regulator.

Having described my invention, I claim:

1. A self-excited alternator system including an alternator having a stationary armature winding, a rotatable shaft, and a field winding on said shaft, means for energizing said field winding comprising a rotary transformer having a secondary on and rotatable with said shaft and comprising a secondary coil wound cylindrically about said shaft and a radially extending magetic member at each end of said secondary coil having a circular configuration and a stationary primary coil wound cylindrically about said secondary coil so as to be co-axial therewith and magnetic members at each end of said primary coil extending radially of said shaft and each defining an opening receiving the said magnetic member of the secondary at the corresponding end of the secondary coil so as to be disposed radially opposite thereto, said primary having magnetic material joining said magnetic members of said primary and encompassing said primary coil and said secondary coil being wound on a magnetic member joining the said magnetic members of the secondary, and regulating means connected to the output of said armature to energize said primary from said armature in dependency on the output of said armature to control the output of the alternator.

2. An altenator system as defined in claim 1 wherein the primary and the secondary of said transformer are each formed by a single coil.

References Cited
UNITED STATES PATENTS

| | | | |
|---|---|---|---|
| 1,394,901 | 10/1921 | Hobart | 336—120 X |
| 2,432,982 | 12/1947 | Braddon et al. | 336—120 X |
| 3,401,328 | 9/1968 | Hartung | 322—28 |

ORIS L. RADER, Primary Examiner

H. HUBERFELD, Assistant Examiner

U.S. Cl. X.R.

322—75; 336—120